United States Patent [19]

Habermann et al.

[11] Patent Number: 4,626,754
[45] Date of Patent: Dec. 2, 1986

[54] METHOD AND DEVICE FOR REDUCING THE VIBRATIONS OF ROTATING MACHINES EQUIPPED WITH AN ACTIVE MAGNETIC SUSPENSION

[75] Inventors: Helmut Habermann, Vernon; Maurice Brunet, Saint Marcel; André Tassel, Gasny, all of France

[73] Assignee: Societe Europeenne de Propulsion, Puteaux, France

[21] Appl. No.: 713,814

[22] Filed: Mar. 20, 1985

[30] Foreign Application Priority Data

Mar. 26, 1984 [FR] France ............... 84 04649

[51] Int. Cl.⁴ .............................. G05B 5/01
[52] U.S. Cl. .................... 318/460; 318/605; 318/629; 318/661; 310/90.5
[58] Field of Search ........... 318/460, 629, 632, 661, 318/605, 637; 308/10; 74/5.6 D; 328/166, 167

[56] References Cited

U.S. PATENT DOCUMENTS

| 3,156,915 | 11/1964 | Lang et al. | 318/629 X |
| 3,373,326 | 3/1968 | Farrand | 318/661 X |
| 3,787,100 | 1/1974 | Habermann et al. | 308/10 |
| 4,121,143 | 10/1978 | Habermann et al. | 318/629 |
| 4,128,795 | 12/1978 | Habermann | 318/661 X |
| 4,244,629 | 1/1981 | Habermann | 308/10 |
| 4,498,037 | 2/1985 | Razavi | 318/632 |

FOREIGN PATENT DOCUMENTS

| 55-10688(A) | 1/1980 | Japan | 318/632 |
| 56-153410 | 11/1981 | Japan | 318/632 |
| 58-03001 | 1/1983 | Japan | 318/632 |

Primary Examiner—William M. Shoop, Jr.
Assistant Examiner—Bentsu Ro
Attorney, Agent, or Firm—Weingarten, Schurgin, Gagnebin & Hayes

[57] ABSTRACT

A device for reducing the vibrations of a rotating machine equipped with an active magnetic suspension comprises at least two vibration detectors located on the machine frame for detecting disturbances applied to the frame, and at least an additional selection feedback loop with narrow band and high gain whose central frequency is synchronized with a reference frequency and which receives signals delivered by the vibration detectors. The additional selective feedback loop comprises means for integrating the signals delivered by the vibration detectors and filtering means for eliminating the transient signals whose frequency is not linked to the reference frequency.

22 Claims, 6 Drawing Figures

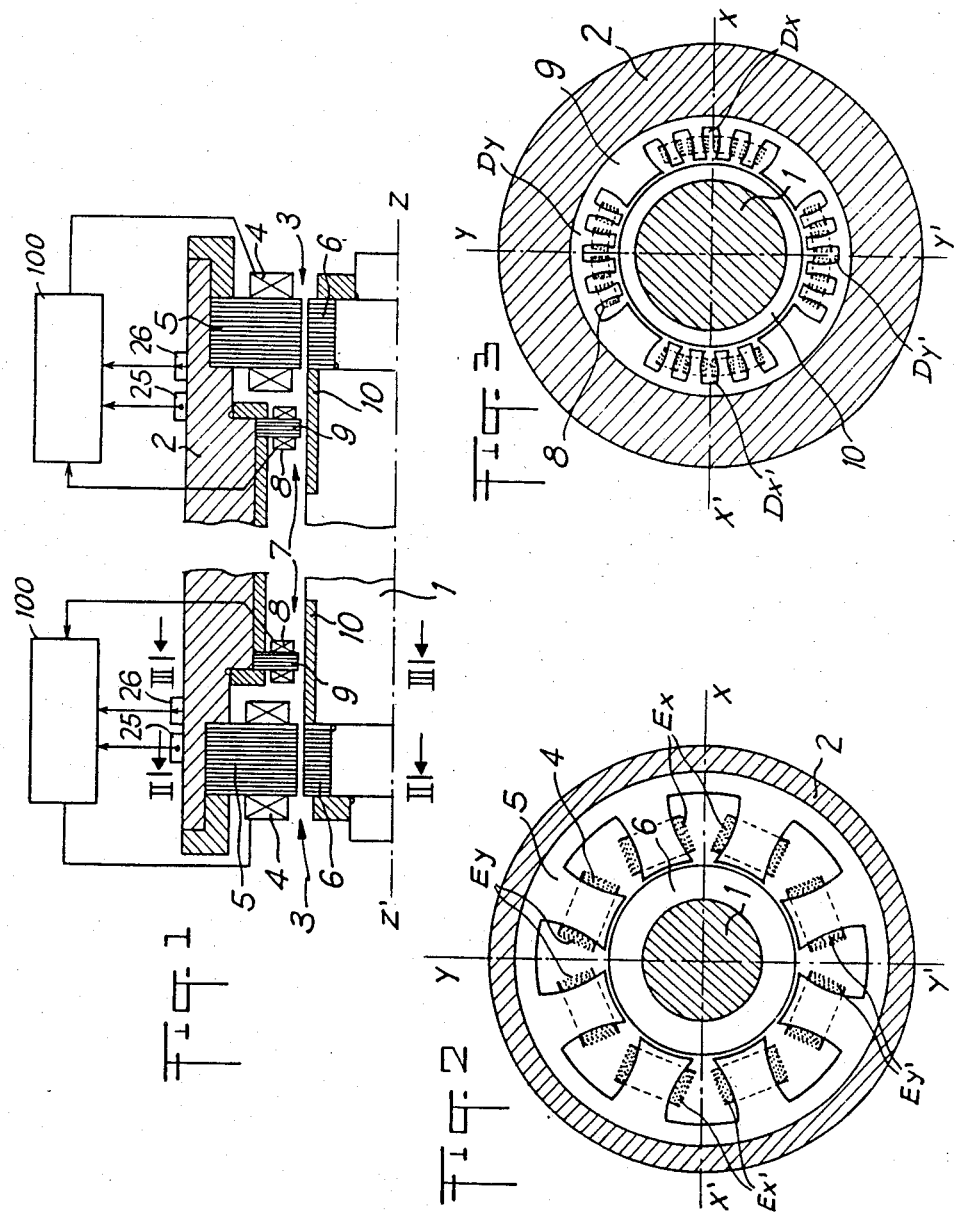

METHOD AND DEVICE FOR REDUCING THE VIBRATIONS OF ROTATING MACHINES EQUIPPED WITH AN ACTIVE MAGNETIC SUSPENSION

The present invention relates to a device for reducing vibrations in a rotating machine of which the rotor is mounted on a frame by way of an active magnetic suspension of the type comprising at least a radial magnetic bearing equipped with electromagnetic coils, at least a radial detector for detecting the position of the rotor and a servo-control circuit connected to said detector and to said coils.

It has been found that in rotating machines, vibrations generating noises are often conveyed by the support bearings. This is the case in particular, when aerodynamic forces are present, which forces are linked for example to the blades of a turbine, or when an electric motor carried by the rotor, creates, by the rotation of its magnetic field, certain disturbances on the frame. The vibrations created in the frame can have a frequency which is directly linked to the rotation speed of the rotor.

This is the case with vibrations caused by unbalance at the actual rotation frequency of the rotor, and which are due to the non-alignment of the inertial axes of the rotor and of the geometrical axis of the bearings. This is also the case with vibrations caused by the interference drag between the stator and the rotor in blowers and compressors. The frequency of the vibrations is then normally represented by several multiples of the rotation frequency of the rotor, multiples which are well defined by the geometry of the stator and of the rotor.

The vibrations generated in the frame may however not be synchronous with the rotation of the rotor, and they may represent multiples of other frequences such as the power supply frequency of an asynchronous electronic motor. Such vibrations may be caused for example by geometrical irregularities in the cage winding of the rotor or else by the presence of a non-sinusoidally rotating field.

Finally, the frame may be subjected to other disturbances of external origin, at frequencies stable in time and readily characterizable, but non-synchronous to the rotation speed of the rotor, or to the rotating field of the electric motor operationally coupled to said rotor.

It has already been proposed, for rotating machines equipped with an active magnetic suspension to reduce the harmful effects due to parasitic disturbances such as those orginating from the existence of an unbalance on the rotor, by creating a sudden drop of gain in the servo-control circuit of the magnetic bearings inside a very narrow frequency band which is a direct function of the speed of rotation of the rotor. This creates an automatic balancing of the rotor by causing its rotation axis to coincide with its inertial axis. Such a type of servo-control system is described in French Pat. No. 2 336 602.

In certain cases, such an automatic balancing system has proved inadequate to definitely prevent vibrations linked to the rotation of the rotor be transmitted to the frame, in particular for frequencies smaller than the actual frequency of the servo-control. Moreover, such an automatic balancing system takes no account of the disturbances which are non-synchronous to the rotation of the rotor.

It has also been proposed to slave the position of a solid suspended by way of active magnetic bearings, by using a signal obtained by double integration from the output signal of an accelerometer. With such a type of servo-control having a wide band, random vibrations are taken into account, but the stability of the servo-control is only adequate if the loop gain is limited. This type of servo-control system has therefore been found to be unsuitable for stabilizing the frame of a rotating machine subjected to repetitive disturbances which may reach a wide amplitude, although corresponding to relatively few vibration frequencies.

It is the object of the present invention to stabilize a frame of rotating machine and to prevent repetitive vibrations generated by elements linked to the rotor of the rotating machine or to other reference sources from being transmitted to the frame.

This object is reached with a device comprising at least two vibration detectors having non-parallel axes which are perpendicular to the axis of the rotor and placed on the frame of the machine for detecting any disturbances to which the frame may be subjected, and an additional selective feedback loop with narrow band and high gain, of which the central frequency is synchronized with a reference frequency and to which are applied the signals produced by said vibration detectors, said additional selective feedback loop with narrow band comprising means for integrating the signals produced by the vibration detectors and filtering means for eliminating the transient signals whose frequency is not linked to said reference frequency.

According to a particular embodiment, the vibration detectors are accelerometers and the integration means operate to provide a double integration of the signals produced by said accelerometers.

According to another embodiment, the vibration detectors are speed sensors and the integration means operate to provide a single integration of the signals produced by the speed sensors.

More particularly, the additional selective feedback loop with narrow band comprises a first conversion circuit of the type adapted to carry out a conversion of coordinates from a fixed coordinate system constituted by the reference axes of the vibration detectors which are perpendicular together and to the predetermined rotation axis of the rotor, into a rotating coordinate system which is constituted by two movable axes, perpendicular to one another and to the rotation axis of the rotor and rotates at a speed which is linked to said reference frequency, and a second conversion circuit of the type adapted to effect a conversion of coordinates from said rotating coordinate system into said fixed coordinate system.

It becomes possible with the present invention to compensate either simultaneously or alternately, with one or more additional feedback loops, disturbances of different origins.

According to a first possibility, the reference frequency is a multiple of the rotation speed of the rotor and a circuit adapted to deliver a signal representing a multiple of the rotation speed of the rotor, is connected to said first and second conversion circuits.

According to another possibility, the reference frequency is a reference which is linked to the power supply frequency of an asynchronous electric motor operationally coupled to the rotor, and a circuit is connected to said first and second conversion circuits and adapted to generate a signal of reference frequency derived from the electric motor power supply.

According to yet another possibility, the reference frequency is a frequency stable in time, detected by a Fourier analysis and independent of the rotation speed of the rotor, and an oscillator of adjustable frequency is connected to said first and second conversion circuits to generate a reference signal having a frequency which is as close as can be expected to said reference frequency.

According to a special embodiment of the invention, the coordinates conversion circuits are of analog type, each one comprising a sine-cosine generator and a static resolver constituted from analog multiplying devices.

In order to permit a compensation of disturbances of which the representative vector does not show a constant amplitude, according to a special feature of the invention, the additional selective feedback loop with narrow band comprises a first conversion circuit comprising a single input resolver and a second conversion circuit including a first transfer function and a first output resolver corresponding to one of the axes of the fixed coordinate system, and a second transfer function and second output resolver corresponding to the other axis of the fixed coordinate system.

In all cases, the coordinate conversion circuits can also be constituted by digital circuits.

A further object of the invention is to propose a method of reducing vibrations in a rotating machine of which the rotor is mounted on a frame by way of an active magnetic suspension comprising at least one radial magnetic bearing equipped with electromagnetic coils, at least one radial detector detecting the position of the rotor and one servo-control circuit connected to said detector and to said coils, wherein said method consists in placing on the frame of the rotating machine at least two vibration detectors having non-parallel axes, which are perpendicular to the axis $zz'$ of the rotor, in recording by means of a spectrum analyzer from the signals produced by the vibration detectors, the vibration frequencies corresponding to repetitive time-stable variations, in identifying the recorded vibration frequencies corresponding to a multiple of the rotation speed of the rotor as well as the recorded vibration frequencies corresponding to a multiple of a known characteristic frequency such as the power supply frequency of an asynchronous motor and the time-stable recorded vibration frequencies non-synchronous to a known characteristic frequency of a machine member, in introducing into the servo-control circuit, in order to compensate for the repetitive vibrations corresponding to the identified vibration frequencies, additional selective feedback loops with narrow band and high gain, the central frequencies of which are synchronized with said identified frequencies respectively, in applying the signals produced by said vibration detectors, after integration, to the different additional selective feedback loops, and in filtering, inside each additional feedback loop, the transient signals the frequency of which is not linked to the identified vibration frequency to be compensated for by said loop.

Advantageously, a first step consists in first recording and identifying, with a spectrum analyzer, first vibration frequencies corresponding to multiples of the rotation speed of the rotor, or if necessary to multiples of a known characteristic frequency, and introducing into the servo-control circuit, first additional selective feedback loops with narrow band and high gain, of which the central frequencies are respectively synchronized with the different first vibration frequencies identified during the first step from signals delivered by a sensor of the rotation speed of the rotor or by a sensor of the known characteristic frequency signal; a second step consists, the first additional selective feedback loops being in service in recording and identifying with the spectrum analyzer second vibration frequencies, which are time-stable and non-synchronous to a known characteristic frequency of a machine member, and in introducing into the servocontrol circuit second additional selective feedback loops with narrow band and high gain, of which the central frequencies are respectively synchronized with the different second vibration frequencies identified during the second step, from oscillators of adjustable frequencies of which the frequencies are adjusted on said second identified vibration frequencies.

It is possible to carry out with the spectrum analyzer, periodical controls of the vibrations frequencies stable in time and non-synchronous to a known characteristic frequency of a machine member and to readjust, after each control, the frequencies of the oscillators of adjustable frequency, as a function of the new values of the second identified vibration frequencies.

Preferably, when recording and identifying the vibration frequencies, no account is taken of the frequencies corresponding to vibrations of amplitude below a predetermined threshold.

It will be noted that, when proceeding by a Fourier analysis, it becomes possible to take into account all the repetitive disturbances to which the frame is subjected and to split up each one into a set of sinusoidal vibrations frequencies.

The invention will be more readily understood on reading the following description with reference to the accompanying drawings in which:

FIG. 1 is a half axial section of a rotor mounted in radial magnetic bearings, showing the location of the position and of the vibration detectors.

FIG. 2 is a cross-sectional view along line II—II of FIG. 1,

FIG. 3 is a cross-sectional view along line III—III of FIG. 1,

Figure 4:
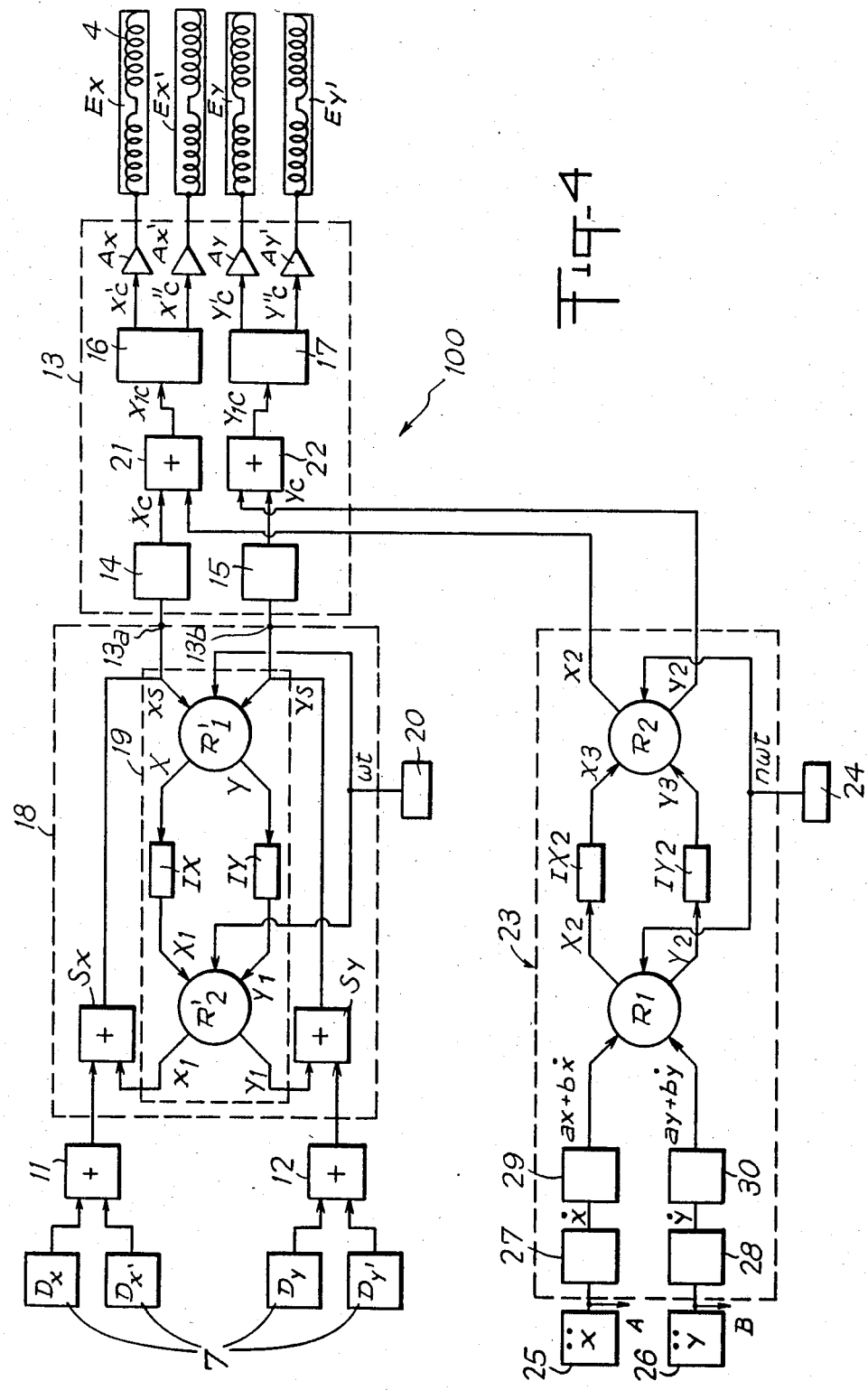
FIGS 4 and 5 are diagrammatical views of the servo-control circuits used for reducing vibrations according to the invention.

Referring first to FIGS. 1 to 3, these show a rotor 1 supported in a stator 2 by means of two radial magnetic bearings 3. Each bearing comprises electromagnetic coils 4 mounted on a fixed armature 5 which cooperates with an annular armature 6 fast with the rotor 1.

The electromagnets are arranged in pairs Ex, Ex', Ey, Ey', along two fixed orthogonal diametral axes, $x'x$ and $y'y$, respectively, which are perpendicular to the predetermined rotation axis $z'z$ defined by the bearing, the two electromagnets of one pair being diametrically opposite and each one exerting a drawing force on the rotor when the coils are supplied. In the illustrated examples, each electromagnet has two series-connected coils 4.

Each bearing is operationally coupled to radial detection means 7 comprising two pairs of detectors Dx, Dx' and Dy, Dy', arranged along two fixed axes, parallel respectively to $x'x$ and $y'y$, the two detectors of each pair being diametrically opposite. In the illustrated example, each detector is constituted by a plurality of windings 8 mounted on a fixed armature 9 cooperating with an annular armature 10 integral with the rotor 1. Obviously, other types of detectors can be used, such as for example detectors of capacitive or optical type.

The rotor 1 can be driven by means of an electric motor (not shown) of which the stator is integral with stator 2 and the rotor is integral with rotor 1.

It is known to control each bearing from the signals of the detectors by way of a circuit equipped with adders such as 11 and 12 (FIG. 4) adding up the signals from each pair of detectors and delivering on their respective outputs, signals x and y representing the difference between the real and the predetermined radial positions of the rotation axis of the rotor, along axes x'x and y'y respectively.

In a known servo-control circuit, the signals x and y are applied to the inputs 13a and 13b respectively of a control circuit 13 whose output supplies the electromagnets Ex, Ex', Ey and Ey' respectively with exciting currents. Such a control circuit comprises for example phase advancing networks 14, 15 delivering control signals $x_c$, $y_c$. Said control signals $x_c$, $y_c$ are outphased by means of phase converters 16, 17 in order to produce signals $x'_c$, $x''_c$ and $y'_c$, $y''_c$ which, once amplified in amplifiers Ax, Ax', Ay, Ay', are applied to electromagnets Ex, Ex', Ey and Ey' with the suitable polarity. Several special embodiments of control circuits are known, such as for example from French Pat. No. 2,149,644.

According to the present invention, vibration detectors 25, 26 are placed directly on the frame 2 of the machine, for example close to each of said radial magnetic bearings 3, such as illustrated in FIG. 1. Said vibration detectors 25, 26 however, may also be shifted and situated on the frame of the machine at some distance from the magnetic bearings. Said vibration detectors 25, 26 are so placed as to detect vibrations in two mutually perpendicular directions represented by a dot and an arrow respectively in FIG. 1, which directions are also perpendicular to the rotation axis ZZ" of the rotor 1, and well-defined with respect to the position of the electromagnets coils 4.

The vibration detectors 25, 26 may be accelerometers or, according to a variant, displacement speed detectors. As illustrated in FIG. 4, the signals produced by the vibration detectors 25, 26 are applied to at least one additional selective feedback loop 23 with narrow band and high gain which is operationally coupled to the servo-control circuit 100 and delivers correction signals $x_2$, $y_2$ which are added in adders 21, 22 to the control signals $x_c$, $y_c$ issued from the phase advancing networks 14, 15 operationally coupled to the conventional servo-system working from position detectors 7. Control signals $x_1c$, $y_1c$ which are applied to phase converters 16, 17 also take into account both the information supplied from detectors Dx, Dx', Dy, Dy' detecting the radial position of the rotor, namely the radial displacements of the rotor 1 with respect to its reference position, and the signals supplied from detectors 25, 26, namely the vibrations to which frame 2 is subjected. But the feedback loop 23 is provided with filtering means to eliminate the transient signals of which the frequency is not linked to a reference frequency which, in the diagram of FIG. 4, is constituted by a multiple nwt of the rotation speed of the rotor.

Thus, it is possible, owing to the vibration detectors 25, 26 placed on the frame, to the additional feedback loop 23 and to adders 21, 22 integrated in one conventional servo--control circuit composed of elements 11, 12, 14, 15, 16, 17 and receiving the output signals from radial position detector 7, and with the servo-control circuit 100 of FIG. 4, to reduce and even to remove altogether any vibration linked to the rotation of the rotor, and in doing so to considerably reduce the noise caused by the operation of the rotating machine.

Up to now, the means provided for reducing the parasitic disturbances created by the rotation of the rotor, particularly due to the unbalance of the latter, had merely comprised a processing circuit such as processing circuit 18 represented in FIG. 4 and described in French Pat. No. 2,336,602. Said processing circuit acts directly on the signals produced by the radial position detector 7 in order to create, within the servo-control circuit, a gain "hole" centered on a frequency which is a direct function of the rotation speed of the rotor, thus making it possible to eliminate in particular, those disturbances linked to the unbalance while leaving the rotor free to rotate about its inertial axis for a narrow band of frequency.

Such a type of compensation for the synchronous disturbances linked to the rotation speed of the rotor cannot however always be achieved for heavy rotating machines, or else the resulting effect is not sufficient to completely remove the vibrations in the frame, especially those which correspond to reference frequencies which are not frequencies directly linked to the rotation speed of the rotor. This is the reason why, according to the invention, for a series of predetermined frequencies, it is possible to perform, with a series of feedback loops 23, 123, 223 (FIG. 5) an accelerometric control of position, from the vibration detectors provided on the frame of the machine and not connected with the rotating part of the machine.

The invention is thus particularly applicable to slow-working heavy duty machines, and in particular machines with horizontal axis, liable to create on the stator, disturbances which are linked to the rotor, either due to aerodynamical forces or due to the presence of an electric driving motor mounted on the rotor.

In FIG. 4, the additional feedback loop 23 produces a gain peak within a predetermined narrow band of frequencies in order to perform a zero-vibration servo-control from the information supplied by the detectors 25, 26.

The vibration detectors provided on the frame 2 deliver output signals which, in a first step, are applied via lines A and B, to a spectrum analyzer of a type known per se and not shown in the drawings, to determine the spectrum of the vibrations caused, for example, by the aerodynamical forces linked to the rotation of the rotor. The detected repetitive vibrations are then split up into a series of harmonics by Fourier analysis, whereas the random disturbances are not taken into account. The re-injecting into the servo-control circuit of the electromagnetic coils, owing to feedback loops such as loop 23, of the frequency spectrum of noted repetitive disturbances, causes the rotor to rotate on an axis modified with respect to the axis defined by the radial bearings. The rotor 1 thus acts as a fly-wheel which moves, owing to the additional feedback, so as to compensate for the disturbances of the stator. The movements of displacement of the rotor are controlled for each feedback loop such as 23 owing to a rotating coordinate system at a frequency which is a multiple of the rotation frequency of the rotor. For other feedback loops, such as loops 123, 223 of FIG. 5, control of the movements of displacement can still be performed owing to a rotary coordinate system at a predetermined reference frequency other than a multiple frequency of the rotation frequency of the rotor, as is explained in detail hereinafter. This permits an efficient damping of any repetitive vibrations, even in machines with frames of limited stiffness.

Referring now to FIG. 4, this shows vibration detectors 25, 26 which may be constituted by accelerometers delivering signals $\ddot{x}$ and $\ddot{y}$. Said signals are integrated first in integrator circuits 27, 28 respectively, then in second integrator circuits 29, 30. In this way, signals are created which represent the displacements of the stator caused by the vibrations. The second integrator circuits 29, 30 may only partly act on the signals issued from the first integrator circuits 27, 28 in order to supply signals having the form or $ax + b\dot{x}$ or $ay + b\dot{y}$ comprising a speed component which creates a damping means, a and b being constants.

According to another possible embodiment of the invention, detectors 25, 26 are constituted by speed sensors and supply directly signals which can be applied to the single integrator circuits 29, 30 which latter will perform a total or partial integration. In this case, the first integrator circuits 27, 28 are eliminated.

The feedback loop 23 comprises a first coordinate conversion circuit or resolver R1, of which a first input receives the signal of the form $ax + b\dot{x}$ produced by the integrator circuit 29 and a second input receives the signal of the form $ay + a\dot{y}$ produced by the integrator circuit 30.

Resolver R1 delivers on its two outputs, signals $X_2$ and $Y_2$ such that:

$$\begin{cases} X_2 = (ax + b\dot{x})\cos nwt + (ay + b\dot{y})\sin nwt \\ Y_2 = -(ax + b\dot{x})\sin nwt + (ay + b\dot{y})\cos nwt \end{cases}$$

w being equal to the angular speed of the rotor, t being the time and n being an integer.

Resolver R1 thus performs a conversion of coordinates from the fixed coordinate system constituted by axes x'x and y'y of vibration detectors 25, 26, which also correspond to the axes of radial position detectors 7, in a coordinate system rotating with respect to the fixed system at an angular speed nwt.

Signals $X_2$ and $Y_2$ are integrated by two integrators $IX_2$ and $IY_2$ outputting signals $X_3$ and $Y_3$, respectively. Said signals $X_3$ and $Y_3$ are applied respectively to a first and to a second input of a coordinates conversion circuit or resolver R2 which performs conversion which is the reverse of that performed by resolver R1 and therefore which outputs respective signals $x_2$ and $y_2$ such that:

$$\begin{cases} x_2 = X_3 \cos nwt - Y_3 \sin nwt \\ y_2 = X_3 \sin nwt + Y_3 \cos nwt \end{cases}$$

As indicated hereinabove, an adder 21 receives on a first input the signal $x_c$ produced by the corrector circuit 14 of the main servo-control loop, and on a second input, the signal $x_2$ produced by the feedback loop 23. In like manner, adder 22 receives on a first input the signal $y_c$ delivered by the corrector circuit 15 of the main servo-control loop, and on a second input, the signal $y_2$ produced by the second feedback loop 23. Signals $x_{1c}$ and $y_{1c}$ produced by adder circuits 21, 22 are respectively applied to phase converter 16 and to phase converter 17, for working out signals $x'_c, x''_c, y'_c, y''_c$.

Each one of resolvers R1 and R2 receives on a third input a signal n w t which corresponds to the multiple frequency of the rotation speed of the motor at which the parasitic disturbances occur.

The resolver circuits R1 and R2 which convert the coordinates between a fixed coordinate system and a rotating coordinate system can be of conventionally known constitution and be, for example, of analog type and produced from analog multiplying circuits and operational amplifiers cooperating with a sine/cosine generator to which the signal n w t produced by circuit 24 is applied. But resolvers R1 and R2 can also be produced in digital form, the signals $ax + $ and $ay + b\dot{y}$ being converted to digital form before being applied to the resolver R1 and the signals $x_2$ and $y_2$ being converted to analog form at the output of circuit 23.

The transfer function T of the additional feedback loop 23 is so determined that for the overall transfer function of the servo-control circuit, a selective gain amplification occurs which is much higher than the internal gain of the main loop of the servo-control, for a frequency band centered on a frequency permanently related to a multiple n w t of the rotation speed of the rotor.

The width of said frequency band is preferably very limited and can for example be around 1 Hz, so that the feedback loop 23 only acts for specific repetitive disturbances. Pass-band $\Delta f$ of integrators $IX_2$ and $IY_2$ is therefore limited to very low frequencies, about 1 Hz or a fraction of Hertz. Integrators $IX_2$ and $IY_2$ preferably have an adjustable gain, for example by means of potentiometers, in order to enable an adjustment of the located increase of the gain of the overall transfer function of the servo-system.

The present invention thus permits by selective gain increases of the servo-control circuit for narrow frequency bands centered on predetermined frequencies, an efficient compensation by an action on the rotor, for any disturbances induced on the stator by differential forces acting, for example, at multiple frequencies of the rotation speed of the rotor, but which do not travel through the bearings, i.e. which are not taken into account by the position detectors, due to the common displacements of the rotor and stator, contrary for example to the unbalance-induced inertial force which may be taken into account by radial position detectors and compensated for by a circuit such as the automatic balancing circuit 18 described in French Pat. 2 336 602 and illustrated in FIG. 4, which performs a filtering of the parasitic error signals generated by the unbalance associated to the rotor 1 without detection at the level of the frame 2 of the machine.

It will be noted that the present invention permits, due to the additional feedback loop 23, to optionally eliminate the need of using an automatic balancing circuit 18 in the main servo-control loop, and in doing so to create a gain "hole" inside a narrow frequency band centered on the rotation speed of the rotor.

Nevertheless, as illustrated in FIG. 4, the use of an additional feedback loop 23 is not incompatible with that of an automatic balancing circuit 18 integrated to the main servo-control loop. And FIG. 4 shows, inside the processing circuit 18, two adders $S_x$ and $S_y$ with two inputs, said adders having first inputs connected respectively to the outputs of adders 11 and 12 and outputs connected respectively to inputs 13a and 13b of the control circuit 13, and respectively delivering signals $x_s$ and $y_s$. A feedback circuit 19 comprising a first resolver $R'_1$, integrators IX and IY and a second resolver $R'_2$, is connected between the outputs of adders Sx and Sy and their second inputs. Each one of resolvers $R'_1$ and $R'_2$ receives on a third input a signal wt delivered by a tachometric converter 20 which works out a quantity proportional to the actual rotation speed of the rotor. Said circuit 18 thus constitutes for the signals produced by detector 7, a notch filter inside a narrow band of frequency centered on a frequency which is permanently equal to the rotation speed of the rotor, this being equivalent to eliminating the stiffness of the bearing for that frequency band.

As indicated in French Pat. No. 2,336,602, the feedback circuit 19B may be used for reducing parasitic disturbances linked to the speed of rotation of the rotor, and not only the disturbances due to the existence of unbalance. However, said circuit 19B does not permit a complete elimination of all the parasitic disturbances which can cause the frame to vibrate. On the contrary, according to the present invention, and due to the vibration detectors 25, 26, placed directly on the frame, it is possible to efficiently eliminate any residual parasitic disturbances which have not been eliminated by the circuit 19B of the main servo-control loop. As indicated hereinabove, the parasitic disturbances linked to the rotation speed of the rotor can be split up into harmonics of the basic frequency which is equal to the rotation speed of the rotor. Thus, it is possible to use several feedback loops similar to loop 23, each one being associated to a particular frequency supplied by a circuit similar to circuit 24. In this case, integrator circuits 27 to 30 can nonetheless be common to several loops 23.

In particular, as will now be explained in detail with reference to FIG. 5, it is also possible to use feedback loops 123, 223, similar to loop 23, but designed to compensate for frequencies which are not directly linked to the speed of rotation of the rotor.

For example, in the case of disturbances created by an asynchronous electric motor linked to the rotor, the disturbances are produced with a frequency which corresponds to the rotation of the magnetic field of said motor, namely to a frequency multiple of the motor power supply frequency, which latter can be of the order of 50 or 60 Hz. In this case, signal $F_E$ applied by the circuit 124 to the loop 123 can be derived directly from the electric motor causing the disturbances, for example from the motor excitation frequency.

In the case of disturbances due to aerodynamical effects of a blower or pump linked to the rotor, the frequency of the disturbances 3Frot, 5Frot or 11Frot for example, is much higher than the speed of rotation of the rotor, but it remains a multiple thereof. Then a feedback loop, such as loop 23 of FIGS. 4 and 5, is used, and the circuit 24 directly supplies a signal corresponding to the frequency of one of the synchronous disturbances to be eliminated, and which have been predetermined by a Fourier analysis. Filtering of circuit 23 which determines a reduced band-pass around the frequencies of vibrations to be eliminated can also be achieved by applying, with the help of circuit 24, either a signal corresponding to the fundamental frequency of the disturbances, or a signal corresponding to harmonics, as a function of the results from the spectral analysis made beforehand for a specific rotating machine.

As already indicated hereinabove, according to the invention, feedback loops with high gain and narrow pass-band 223, 223a can be inserted in the servo-control circuit 100 in order to compensate disturbances at specific reference frequencies $F_R$, stable in time, but not directly linked to the rotation of the rotor, or to a specially identifiable machine member such as an electric motor. In the case of such repetitive disturbances which are readily identifiable but of unknown origin, it is possible to use feedback loops similar to loops 23 or 123, but the application of a reference frequency $F_R$ to compensation loop 223 is then performed from an oscillator 224 of adjustable frequency adjusted in relation to the frequency $F_{R'}$ and not from a signal directly derived from the member creating the disturbance as in the case of circuits 24, 124.

Figure 5:
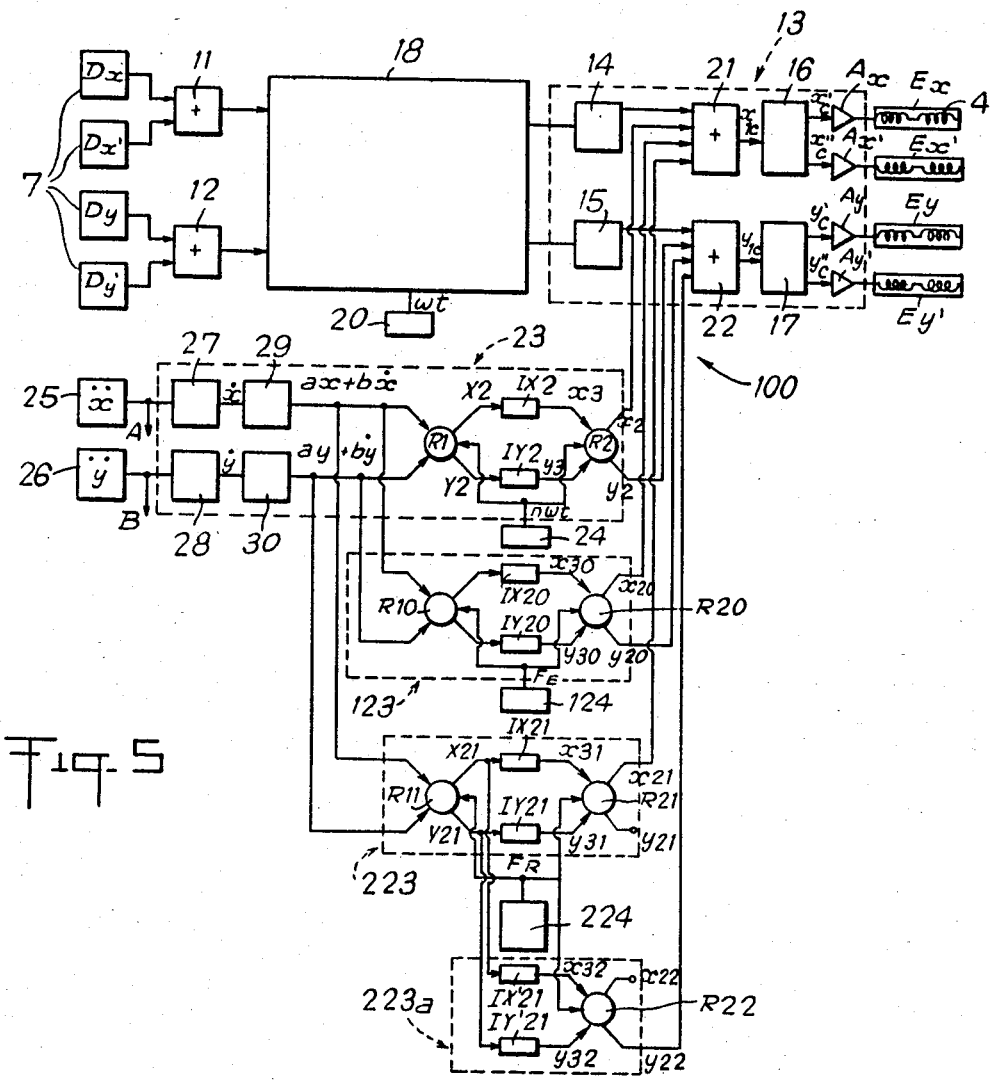

Feedback circuits 23, 123, 223 illustrated in FIG. 5, are quite similar together, although they are designed to compensate for disturbances of different origin. For example, loops 23, 123, 223 are all fed with signals produced from vibration sensors 25, 26. As shown in FIG. 5, integrator circuits 27 to 30 can be used for all of the compensation loops 23, 123, 223.

Each one of compensation loops 23, 123, 223 comprises a first input resolver R1, R10, R11 and at least one output resolver R2, R20, R21, R22. For each loop 23, 123, 223 the input and output resolvers receive the same signal nwt, $F_E$, $F_R$ produced by circuits 24, 124, 224 respectively, and representing the frequency of the disturbance to be reduced by the loop in question. The transfer functions $IX_2$, $IY_2$; $IX_{20}, IY_{20}$; $IX_{21}$, $IY_{21}$ of the different feedback loops 23, 123, 223 are naturally adapted to the amplitude and to the phase of the vibrations to be compensated. In the case of a disturbance frequency $F_R$ which is not synchronous to the speed of rotation of the rotor or to the rotating field of a motor, and which is to be compensated by a loop such as loop 223, the variable frequency oscillator 224 has to be adjusted as accurately as possible on the disturbance frequency $F_R$. The pass-band of the filter of loop 223 is obviously all the bigger than the frequency is undefined, but it has to remain narrow in order for the loop to retain a high gain and efficiency.

According to one possible embodiment of the invention, the frequencies of disturbances of unknown origin such as frequency $F_R$ are periodically identified and counted by means of a spectrum analyzer receiving the signals supplied on lines A and B by accelerometers 25, 26, and the frequency of the variable frequency oscillator 224 is adjusted after each control, as well as, if necessary, the transfer function $IX_{21}$, $IY_{21}$ of compensation circuit 223.

The device according to the invention further permits to compensate for the most varied of disturbances. For example, in the case of a disturbance such as due to unbalance, the disturbance vector is constant and is expressed on two perpendicular axes by a signal which varies sinusoidally with a phase difference of 90°. In this case, a single feedback loop such as loop 23 in FIGS. 4 and 5 is sufficient to compensate entirely for the disturbance.

In other cases, the disturbances are expressed by vectors of non-constant amplitude and the Lissajous figure of the signals on the perpendicular axes x and y are expressed by an ellipse or by a straight line. In this case, it is preferable to use for an input resolver $R_{11}$, two output resolvers $R_{21}$ and $R_{22}$, one corresponding to a compensation along first axis x and the other to a compensation along second axis y (FIG. 5). The two output resolvers $R_{21}$, $R_{22}$ receive the same signal of reference frequency $F_R$ from circuit 224, but the transfer functions $IX_{21}$, $IY_{21}$ differ from the circuits interposed between input resolver $R_{11}$ and output resolvers $R_{21}$ and $R_{22}$. Thus, first output resolver $R_{21}$ receives signals x31 and y31 from signals x21 and y21 whereas the second output resolver $R_{22}$ receives signals x32 and y32 from the signals $X_{21}$ and $Y_{21}$ of resolver $R_{11}$ and produces signals x22 and y22. Insofar as signals x21 and y22 for example, are taken from the first and second output resolvers $R_{21}$, $R_{22}$ in order to apply them to adder circuits 21 and 22, by adjusting the transfer functions of circuits 223 and 223a comprising resolvers $R_{21}$ and $R_{22}$, it is possible to process via loop 223, 223a, any disturbance of which the Lissajous figure represents a circle or an ellipse or a straight line. Feedback loops 23 and 123 could obviously also comprise a split part of the circuit which is similar to that part of the circuit which is similar to that part of the circuit 223a which comprises the second output resolver $R_{22}$ in order to cure synchronous disturbances of variable amplitude or badly defined phase.

Figure 6:
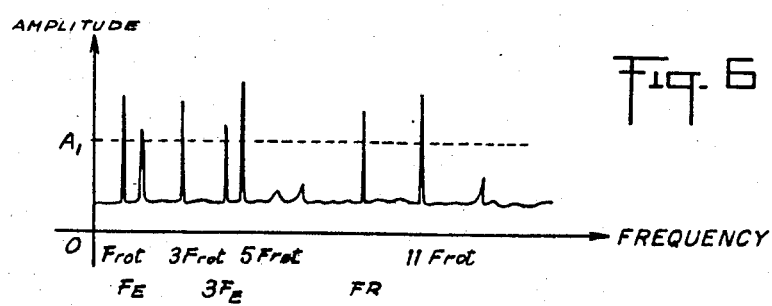
FIG. 6 is a graph of an example of spectrum of vibration frequencies which can be compensated according to the invention.

FIG. 6 shows an example of spectrum of frequencies obtained by harmonic analysis using a spectrum analyzer, from signals produced by accelerometers 25, 26.

It is found that disturbances are present with an amplitude which is greater than a predetermined value $A_1$ for a Frot frequency corresponding to the rotation speed of the rotor, frequencies 3Frot, 5Frot, 11Frot corresponding respectively to 3rd, 5th and 11th harmonics of the basic frequency of rotation of the rotor, a frequency $F_E$ corresponding to the frequency of the revolving field of an electric motor driving the rotor, a frequency $3F_E$ corresponding to three times the frequency $F_E$ and a disturbance frequency $F_R$ of unknown origin but which remains stable in time. A compensation of all the aforecited disturbances Frot, 3Frot, 5Frot, 11Frot linked to the rotation of the rotor and giving rise to vibrations of amplitude greater than threshold $A_1$ can then be performed by using a set of feedback loops such as loop 23 of FIGS. 4 and 5. The circuits 24 producing signals which are proportional to the frequencies Frot, 3Frot, 5Frot, 11Frot can then obviously use the same tachometric generatrix or the same angular coder supplying an indication of the speed of rotation of the rotor. A compensation of the disturbances $F_E$ and $3F_E$ can, in like manner, be performed from two feedback loops such as loop 123 of FIG. 5, with circuits 124 delivering signals proportional to $F_E$ and $3F_E$ respectively. Finally a compensation of the disturbance frequency $F_R$ can be performed with a loop such as loop 223, 223a of FIG. 5.

The invention thus permits to reduce considerably and even to eliminate altogether a whole assembly of repetitive disturbances to which the frame of a rotating machine is subjected, by re-injecting signals of appropriate phase and amplitude, as long as these disturbances have been identified by spectral analysis. It is also possible according to the invention to adapt the vibration reduction device, provided that the spectrum of any residual vibrations to which the frame is subjected is periodically monitored when the vibration reduction device is in service.

It will finally be noted that the additional feedback loops to be inserted into the servo-control circuit 100 for reducing the vibrations of the frame can easily be produced by the conventional techniques and can utilize the signals produced by only one pair of accelerometers.

Obviously, every active radial magnetic bearing supporting the rotor of a rotary machine can be equipped with the same vibration reducing system.

What we claim is:

1. Method for reducing the vibrations of a rotating machine having a rotor mounted on a frame by way of an active magnetic suspension comprising at least one radial magnetic bearing equipped with electromagnetic coils, at least one radial detector for detecting the position of the rotor and a servo-control circuit connected to said detector and said coils, wherein said method consists in placing on the frame of the rotary machine, at least two vibration detectors having non-parallel axes which are perpendicular to the rotor axis, in recording by means of a spectrum analyzer, from the signals issued from the vibration detectors, the vibration frequencies corresponding to repetitive and stable in time disturbances, in identifying the recorded vibration frequencies corresponding to a multiple of the rotation speed of the rotor, the vibration frequencies corresponding to a multiple of a known characteristic frequency such as the power supply frequency of an asynchronous motor and the vibration frequencies which are stable in time, but non synchronous to a known characteristic frequency of a machine member, in introducing in the servo-control circuit, in order to compensate for the repetitive vibrations corresponding to the identified vibration frequencies, additional selective feedback loops with narrow band a high gain, the central frequencies of which are synchronized with the identified vibration frequencies respectively, in applying the signals produced by said vibration detectors, after integration, to the different additional feedback loops, and in filtering, inside each additional feedback loop, the transient signals whose frequencies are not related to the identified vibration frequency to be compensated by said loop.

2. Method as claimed in claim 1, wherein a first step consists in first determining, with a spectrum analyzer, first vibration frequencies which correspond to multiples of the rotor rotation speed or if necessary to multiples of a known characteristic frequency, and in introducing into the servo-control circuit additional selective feedback loops with narrow band and high gain the central frequencies of which are respectively synchronized with the different first vibration frequencies recorded during the first step, from signals delivered by sensors of the rotation speed of the rotor or by a sensor of the signal of known characteristic frequency, and, a second step consists in determining with the spectrum analyzer, while the first additional feedback loops are in use, second vibration frequencies which are stable in time and non-synchronous to a known characteristic frequency of a machine member, and in introducing into the servo-control circuit, second additional selective feedback loops with narrow band and high gain, the central frequencies of which are respectively synchronized with the different second vibration frequencies identified during the second step, from oscillators of adjustable frequency, the frequencies of which are adjusted on said second identified vibration frequencies.

3. Method as claimed in claim 2, wherein a control of the vibration frequencies which are stable in time and non-synchronous to a known characteristic frequency of a machine member is connected periodically with a spectrum analyzer, and after each control, the frequencies of the oscillators of adjustable frequency are readjusted as a function of the new values of the second indentified vibration frequencies.

4. Method as claimed in claim 1, wherein when recording and identifying the vibration frequencies, no account is taken of the frequencies corresponding to vibrations of amplitude below a predetermined threshold.

5. Device for reducing the vibrations of a rotating machine having a rotor mounted on a frame by way of an active magnetic suspension of the type comprising at least one radial magnetic bearing equipped with electromagnetic coils, at least one radial detector for detecting the position of the rotor and one servo- control circuit connected to said detector and to said coils, wherein said device comprises at least two vibration detectors having non-parallel axes which are perpendicular to the axis of the rotor and are fixed on the frame of the machine for detecting any disturbance to which the frame may be subjected, and at least one additional selective feedback loop with narrow band and high gain, having a central frequency which is synchronous with a reference frequency, said additional selective feedback loop with narrow band being adapted to receive the signals issued from said vibration detectors and comprising means for integrating the signals issued from the vibration detectors and filtering means for removing the transient signals the frequency of which is not linked to the reference frequency, said additional selective feedback loop with a narrow band comprising a first conversion circuit of the type capable of converting coordinates from a fixed coordinate system constituted from the reference axes of the vibration detectors, which axes are perpendicular to one another and to the predetermined rotation axis of the rotor into a rotating coordinate system which is constituted by two movable axes, perpendicular to one another and to the rotation axis of the rotor and rotating at a speed linked to the reference speed, and a second conversion circuit of the type capable of converting coordinates from said rotary coordinate system into said fixed coordinate system, said reference frequency is a stable-in-time frequency detected by Fourier analysis and independent of the speed of rotation of the rotor, and an oscillator of adjustable frequency connected to said first and second conversion circuits to generate a reference having a frequency which is substantially equal to said reference frequency.

6. The device as claimed in claim 5, wherein said vibration detectors are accelerometers and the integration means operate to provide a double integration of the signals produced by the accelerometer.

7. Device as claimed in claim 5, wherein said vibration detectors are speed sensors and the integration means operate to provide a simple integration of the signals produced by the speed sensors.

8. Device as claimed in claim 5, wherein the coordinates conversion circuits are of analog type, each one comprising a sine/cosine generator and a static resolver constituted from analog multiplying devices.

9. Device as claimed in claim 5, wherein the additional selective feedback loop with narrow band comprises a first conversion circuit with a single input resolver and a second conversion circuit including a first transfer function and a first output resolver corresponding to one of the axes of said fixed coordinate system and a second transfer function with a second output resolver corresponding to the other axis of said fixed coordinate system.

10. Device as claimed in claim 5, wherein said coordinates conversion circuits are constituted by digital circuits.

11. Device for reducing the vibrations of a rotating machine having a rotor mounted on a frame by way of an active magnetic suspension of the type comprising at least one radial magnetic bearing equipped with electromagnetic coils, at least one radial detector for detecting the position of the rotor and one servo-control circuit connected to said detector and to said coils, wherein said device aims at stabilizing the frame by limiting frame vibrations and comprises at least two vibration detectors having non-parallel axes which are perpendicular to the axis of the rotor and are fixed on the frame of the machine for detecting any disturbance to which the frame may be subjected, and at least one additional selective feedback loop with narrow band and high gain, having a central frequency which is synchronized with a reference frequency, said additional selective feedback loop with narrow band being adapted to receive the signals issued from said vibration detectors and comprising means for integrating the signals issued from the vibration detectors and filtering means for removing the transient signals the frequency of which is not linked to the reference frequency, said additional selective feedback loop with narrow band comprising a first conversion circuit of the type capable of converting coordinates from a fixed coordinate system constituted or the reference axes of the vibration detectors, which axes are perpendicular to one another and to the predetermined rotation axis of the rotor into a rotating coordinate system which is constituted by two movable axes, perpendicular to one another and to the rotation axis of the rotor and rotating at a speed linked to the reference speed, and a second conversion circuit of the type capable of converting coordinates from said rotary coordinate system into said fixed coordinate system, said reference frequency being a multiple of the rotation speed of the rotor, and further including circuit means for delivering a signal representing a multiple of the rotation speed of the rotor to said first and second conversion circuits.

12. Device as claimed in claim 11, wherein said vibration detectors are accelerometers and the integration means operate to provide a double intergration of the signals produced by the accelerometer.

13. Device as claimed in claim 11, wherein said vibration detectors are speed sensors and the integration means operate to provide a simple integration of the signals produced by the speed sensors.

14. Device as claimed in claim 11, wherein the coordinates conversion circuits are of analog type, each one comprising a sine-cosine generator and a static resolver constituted from analog multiplying devices.

15. Device as claimed in claim 11, wherein the additional selective feedback loop with narrow band comprises a first conversion circuit with a single input resolver and a second conversion circuit including a first transfer function and a first output resolver corresponding to one of the axes of said first coordinate system and a second transfer function with the second output resolver corresponding to the other axis of said fixed coordinate system.

16. Device as claimed in claim 11, wherein said coordinates conversion circuits are constituted by digital circuits.

17. Device for reducing the vibrations of a rotating machine having a rotor mounted on a frame by way of an active magnetic suspension of the type comprising at least one radial magnetic bearing equipped with electromagnetic coils, at least one radial detector for detecting the position of the rotor and one servo-control circuit connected to said detector and to said coils, wherein said device aims at stabilizing the frame by limiting frame vibrations and comprises at least two vibration detectors having non-parallel axes which are perpendicular to the axis of the rotor and are fixed on the frame of the machine for detecting any disturbance to which the frame may be subjected, and at least one additional selective feedback loop with narrow band and high gain, having a central frequency which is synchronized with a reference frequency, said additional selective feedback loop with narrow band being adapted to receive the signals issued from said vibration detectors and comprising means for integrating the signals issued from the vibration detectors and filtering means for removing the transient signals the frequency of which is not linked to the reference frequency, said additional selective feedback loop with narrow band comprising a first conversion circuit of the type capable of converting coordinates from a fixed coordinate system constituted by the reference axes of the vibration detectors, which axes are perpendicular to one another and to the predetermined rotation axis of the rotor into a rotating coordinate system which is constituted by two movable axes, perpendicular to one another and to the rotation axis of the rotor and rotating at a speed linked to the reference speed, and a second conversion circuit of the type capable of converting coordinates from said rotary coordinate system into said fixed coordinate system, said reference frequency is a frequency which is linked to the power supply frequency of an asynchronous electric motor operationally coupled to the rotor, and circuit means connected to said first and second conversion circuits for delivering a signal of reference frequency derived from the power supply of the electric motor.

18. Device as claimed in claim 17, wherein said operation detectors are accelerometers and the integration means operate to provide a double integration of the signals produced by the accelerometer.

19. Device as claimed in claim 17, wherein said vibration detectors are speed sensors and the integration means operate to provide a simple integration of the signals produced by the speed sensors.

20. Device as claimed in claim 17, wherein the coordinates conversion circuits are analog type, each one comprising a sine/cosine generator and a static resolver constituted from analog multiplying devices.

21. Device as claimed in claim 17, wherein the additional selective feedback loop with narrow band comprises a first conversion circuit with a single input resolver and a second conversion circuit including a first transfer function and a first output resolver corresponding to one of the axes of said fixed coordinate system and a second transfer function with the second output resolver corresponding to the other axes of said fixed coordinate system.

22. Devices as claimed in claim 17, wherein said coordinates conversion circuits are constituted by digital circuits.

* * * * *

UNITED STATES PATENT AND TRADEMARK OFFICE
CERTIFICATE OF CORRECTION

PATENT NO. : 4,626,754

DATED : December 2, 1986

INVENTOR(S) : Helmut Habermann, et al

It is certified that error appears in the above-identified patent and that said Letters Patent is hereby corrected as shown below:

Column 1, line 37, "frequences" should read --frequencies--.

Column 1, line 51, "orginating" should read --originating--.

Column 1, line 61, "rotor be transmitted" should read --rotor from being transmitted--.

Column 4, line 8, "servocontrol" should read --servo-control--.

Column 4, line 54, "diametral axes," should read --diametrical axes,--.

Column 7, line 16, "form or ax+bx" should read --form ax+bx--.

Column 8, line 15, "ax+and" should read --ax+bx and--.

UNITED STATES PATENT AND TRADEMARK OFFICE
CERTIFICATE OF CORRECTION

PATENT NO. : 4,626,754

DATED : December 2, 1986

INVENTOR(S) : Helmut Habermann, et al

It is certified that error appears in the above-identified patent and that said Letters Patent is hereby corrected as shown below:

Column 10, line 29, "$IX_{20}$, $IY_{20}$: $IX_{21}$," should read --$IX_{20}$, $IY_{20}$; $IX_{21}$,--.

Column 14, line 26, "tuted or the" should read --tuted by the--.

Signed and Sealed this

Second Day of February, 1988

Attest:

DONALD J. QUIGG

Attesting Officer

Commissioner of Patents and Trademarks